United States Patent
Takahashi et al.

(10) Patent No.: US 8,873,124 B2
(45) Date of Patent: Oct. 28, 2014

(54) PLASTIC OPTICAL ELEMENT, OPTICAL SCANNER INCLUDING THE PLASTIC OPTICAL ELEMENT, AND IMAGE FORMING APPARATUS INCLUDING SAME

(75) Inventors: Go Takahashi, Kanagawa (JP); Eiichi Hayashi, Kanagawa (JP); Akio Hirano, Kanagawa (JP); Takamichi Ohta, Kanagawa (JP); Kan Aoki, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 298 days.

(21) Appl. No.: 13/152,538

(22) Filed: Jun. 3, 2011

(65) Prior Publication Data

US 2011/0304896 A1 Dec. 15, 2011

(30) Foreign Application Priority Data

Jun. 14, 2010 (JP) ................................. 2010-134898

(51) Int. Cl.
*G02B 26/08* (2006.01)
*G02B 13/00* (2006.01)
*B29D 11/00* (2006.01)

(52) U.S. Cl.
CPC ........ *B29D 11/0073* (2013.01); *G02B 13/0005* (2013.01)
USPC .................................... 359/205.1; 359/204.1

(58) Field of Classification Search
USPC .................. 359/204.1–207.6, 662; 347/233, 347/243–244, 258–261
See application file for complete search history.

(56) References Cited

U.S. PATENT DOCUMENTS

| 7,898,739 B2 | 3/2011 | Hayashi et al. |
| 2007/0216983 A1* | 9/2007 | Hayashi et al. ............... 359/201 |
| 2009/0168188 A1 | 7/2009 | Takahashi et al. |
| 2009/0231410 A1 | 9/2009 | Hayashi et al. |

FOREIGN PATENT DOCUMENTS

| JP | 11-028745 A | 2/1999 |
| JP | 2000-084945 A | 3/2000 |
| JP | 2002-059463 A | 2/2002 |
| JP | 2006-051822 A | 2/2006 |
| JP | 2007-133179 A | 5/2007 |
| JP | 2009-222934 A | 10/2009 |
| JP | 2010-176062 A | 8/2010 |

* cited by examiner

*Primary Examiner* — James Phan
(74) *Attorney, Agent, or Firm* — Dickstein Shapiro LLP

(57) ABSTRACT

A plastic optical element for focusing light to a target includes a first lens and a second lens. The first lens includes an incident surface, a projection surface opposite the incident surface, and a non-optical surface through which light does not pass and that includes a non-transfer portion. At least one light beam passes from the incident surface to the projection surface. The second lens includes an incident surface, a projection surface opposite the incident surface, and a non-optical surface through which light does not pass and that includes a non-transfer portion disposed opposite the non-optical surface of the first lens. At least one light beam passes from the incident surface to the projection surface. The non-transfer portions of the first lens and the second lens are portions on which no surface is transferred from a surface of a mold used to form the plastic optical element.

8 Claims, 12 Drawing Sheets

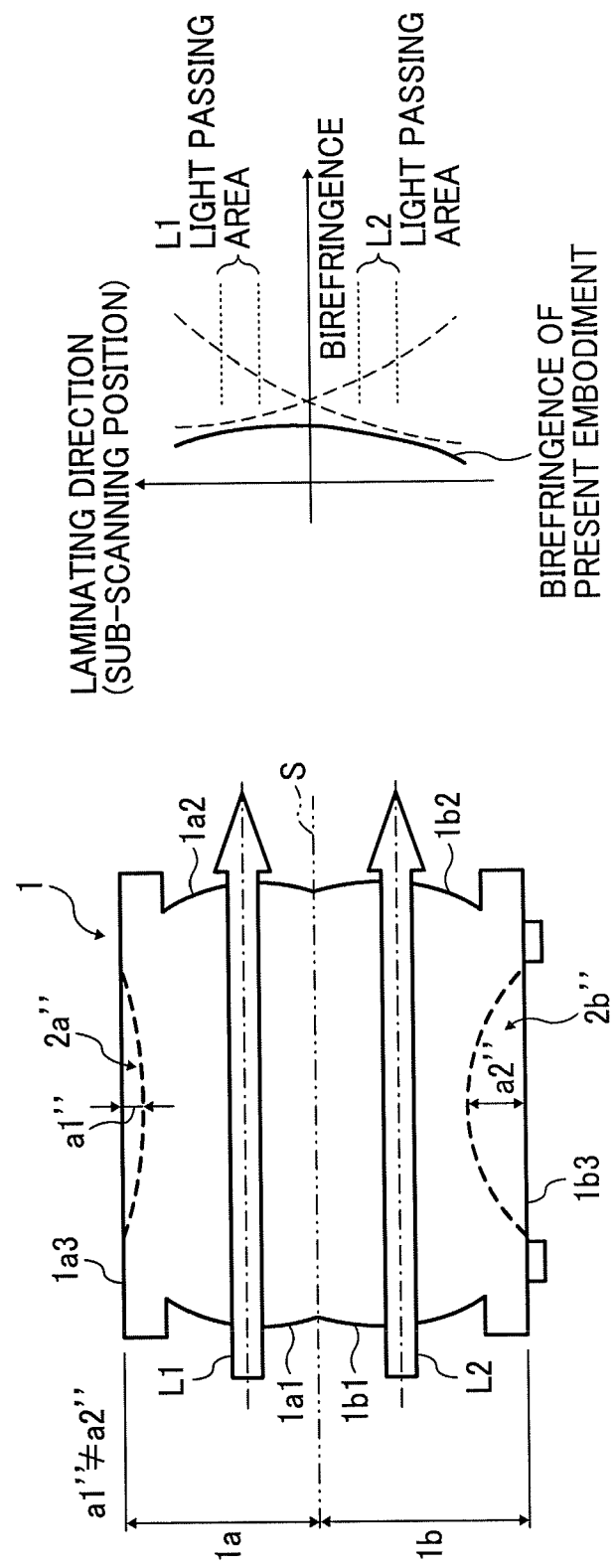

PLASTIC OPTICAL ELEMENT, OPTICAL SCANNER INCLUDING THE PLASTIC OPTICAL ELEMENT, AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application No. 2010-134898, filed on Jun. 14, 2010 in the Japan Patent Office, which is hereby incorporated herein by reference in its entirety.

BACKGROUND OF THE INVENTION

1. Field of the Invention

Exemplary aspect of the present invention generally relate to a plastic optical element produced by molding, an optical scanner including the plastic optical element, and an image forming apparatus including the optical scanner.

2. Description of the Background Art

In order to achieve high-speed and high-quality imaging in color image forming apparatuses such as digital copiers and laser printers, four photoconductive drums, one for each of the colors yellow, magenta, cyan, and black, are arranged in tandem in a direction of conveyance of a sheet and exposed simultaneously by a plurality of light beams so that a latent image is formed on each of the photoconductive drums. The multiple latent images on the photoconductive drums are then developed with toner by developing devices of the respective colors, and transferred onto an intermediate transfer belt or a recording medium so that they are superimposed one atop the other.

Such image forming apparatuses employ an optical scanner for writing an image on the photoconductive drums. In general, the optical scanner is equipped with a plurality of light sources to project light beams for each color, a light deflector to deflect and scan the light beams, and a plurality of imaging optical systems including imaging optical elements for each light beam to focus the deflected light beams onto the photoconductive drums.

In such an optical scanner, as described above the imaging optical system is provided for each light beam, necessitating multiple imaging optical elements having the same shape. (For example, if the imaging optical system employs one imaging optical element per light beam, four imaging optical elements having the same shape are needed. In a case of using two imaging optical elements per optical system, eight optical elements are needed.) The drawback to this configuration is that the size of the optical scanner tends to be large, thereby defeating the purpose of reducing the size of the optical scanner.

In order to reduce the size of the optical scanner, in one approach, a plurality of the imaging optical elements of the imaging optical systems are laminated one atop the other and adhered together, and the imaging optical systems are disposed close to each other.

However, when laminating two imaging optical elements together, the optical elements need to be fixed together by some sort of adhesive, thus complicating manufacturing process. To address this difficulty, in order to reduce manufacturing steps and cost, the imaging optical elements are molded together by a molding process, forming an integral double-layer imaging optical element.

There is increasing demand for use of plastic material in the optical element employed in the optical scanner to reduce its cost. Furthermore, in order to provide the optical scanner with multiple capabilities, a mirror surface of the optical element tends to have a complicated aspheric shape. To fabricate such an optical element, molding is suitable for mass production at low cost.

More specifically, a mold assembly including a cavity having particular shapes associated with the functions of the optical element enables mass production of such an optical element at low cost. Forming an optical element using a resin injection molding process involves cooling the molten resin in the cavity inside the mold to harden the resin. In order to reduce deformation of the molten resin in the cavity, the internal pressure of the resin in the cavity is reduced intentionally.

However, there is a drawback to this approach in that, when the pressure of the molten resin in the cavity is reduced, the resin shrinks undesirably in the subsequent cooling and hardening process. Its shrinkage pulls the resin from the inner mold surface, thereby separating the resin from the mold surface and hence generating a sink in an optical surface of the optical element. A sink is a known phenomenon in the molding process in which a surface of the molten resin subsides.

In view of the above, a non-transfer portion on which the surface of the mold is not transferred, that is, a sink, is formed in one of non-optical surfaces of the optical element other than the optical surface. The non-optical surface is a surface through which no light passes. The sink is deliberately and preferentially generated in the non-optical surface, thereby preventing the sink from appearing undesirably in the optical surface when the pressure of the molten resin in the cavity is reduced.

More specifically, a single cavity piece that forms a surface other than the optical surface to the resin is slidably disposed. When the resin is cooled below its softening temperature, the slidable cavity piece is slid away from the resin, thereby forcibly forming a void between the resin and the cavity piece. Accordingly, the non-transfer portion (the sink) is formed in the resin. In this configuration, the non-transfer portion shrinks, deliberately forming the sink in the non-optical surface. As a result, the sink is prevented from appearing in the optical surface.

Alternatively, the cavity piece that forms the surface other than the optical surface includes a vent hole through which compressed air is blown so that the sink is generated deliberately in the surface contacting the compressed air, as the resin is cooled below its softening temperature. This method is advantageous for a relatively thin plastic optical element in a light penetrating direction, in which a wide area of the non-transfer portion is difficult to obtain, and thus a volume of the shrinkage of the non-transfer portion due to natural shrinkage is insufficient to prevent the sink from appearing on the optical surface. As a result, the sink is generated undesirably on the optical surface. To address this difficulty, blowing the compressed air onto the resin works well to generate deliberately the sink on the non-transfer portion.

Although advantageous and generally effective for its intended purpose, if the integral double-layer plastic lens has the non-transfer portion on the non-optical surface, an absolute value and a gradient of birefringence of the lens near the non-transfer portion are relatively small, but the absolute value and the gradient of birefringence far from the non-transfer portion are large.

In such a case, a wavefront of the transmitted light varies significantly far from the non-transfer portion, causing degradation of the beam waist diameter, which results in degradation of imaging quality.

SUMMARY OF THE INVENTION

In view of the foregoing, in one illustrative embodiment of the present invention, a plastic optical element for focusing light to a target includes a first lens and a second lens. The first lens includes an incident surface, a projection surface opposite the incident surface, and a non-optical surface through which light does not pass and that includes a non-transfer portion. At least one light beam passes from the incident surface to the projection surface. The second lens includes an incident surface, a projection surface opposite the incident surface, and a non-optical surface through which light does not pass and that includes a non-transfer portion disposed opposite the non-optical surface of the first lens. At least one light beam passes from the incident surface to the projection surface. The non-transfer portions of the first lens and the second lens are portions on which no surface is transferred from a surface of a mold used to form the plastic optical element.

Additional features and advantages of the present invention will be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of illustrative embodiments when considered in connection with the accompanying drawings, wherein:

FIG. 11A is a schematic cross-sectional view of a plastic optical element along a direction of lamination thereof according to yet still another illustrative embodiment of the present invention;

FIG. 11B is a graph showing the optical characteristics of the plastic optical element of FIG. 11A;

DETAILED DESCRIPTION OF ILLUSTRATIVE EMBODIMENTS

Figure 1B:
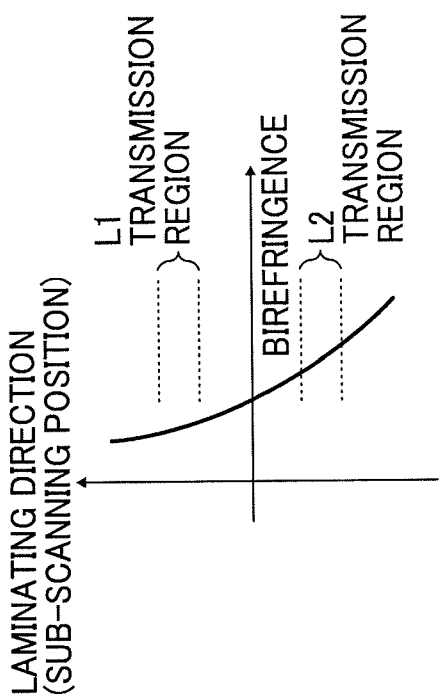
FIG. 1B is a graph showing the optical characteristics of the plastic optical element of FIG. 1A.

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Figure 1A:
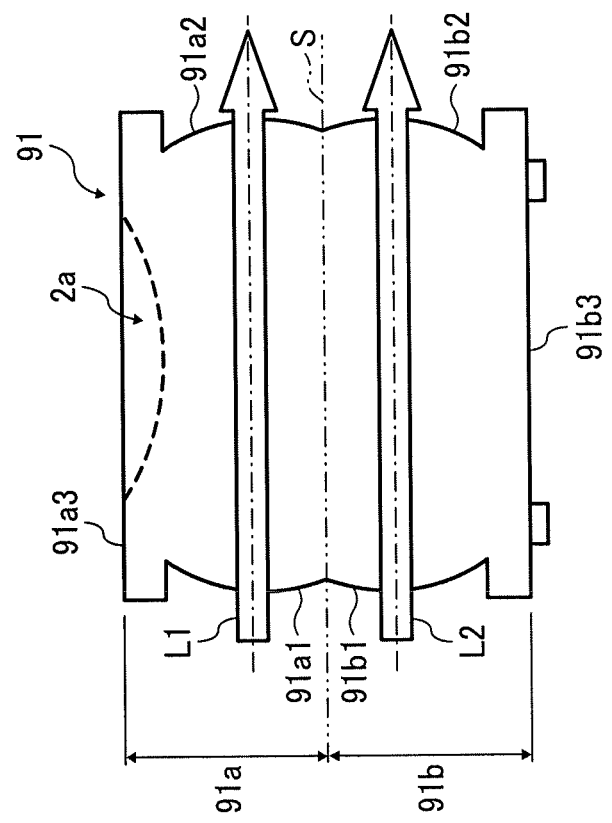
FIG. 1A is a schematic cross-sectional view of a related-art plastic optical element along a direction of lamination of the plastic optical element.
Figure 2:
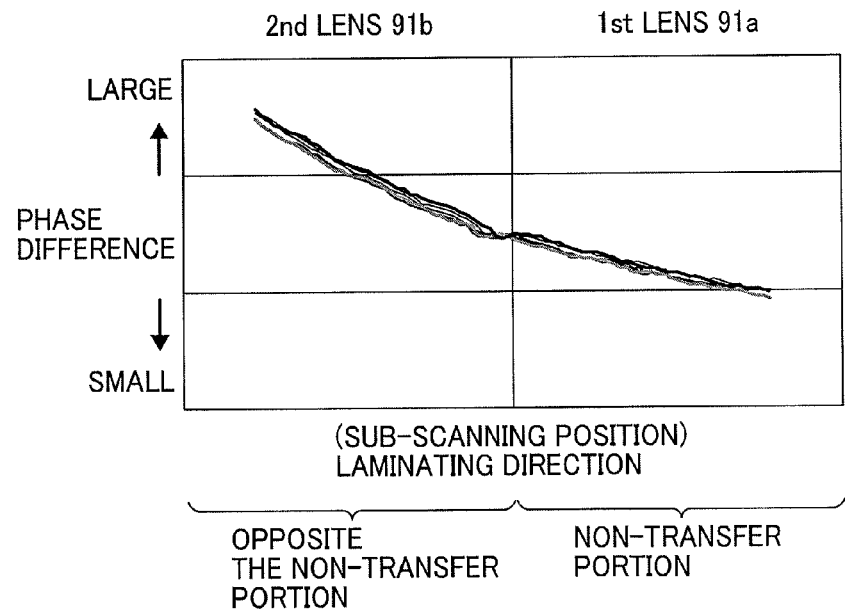
FIG. 2 is a graph showing results of an optical characteristic measurement of the related-art plastic optical element.
Figure 3:
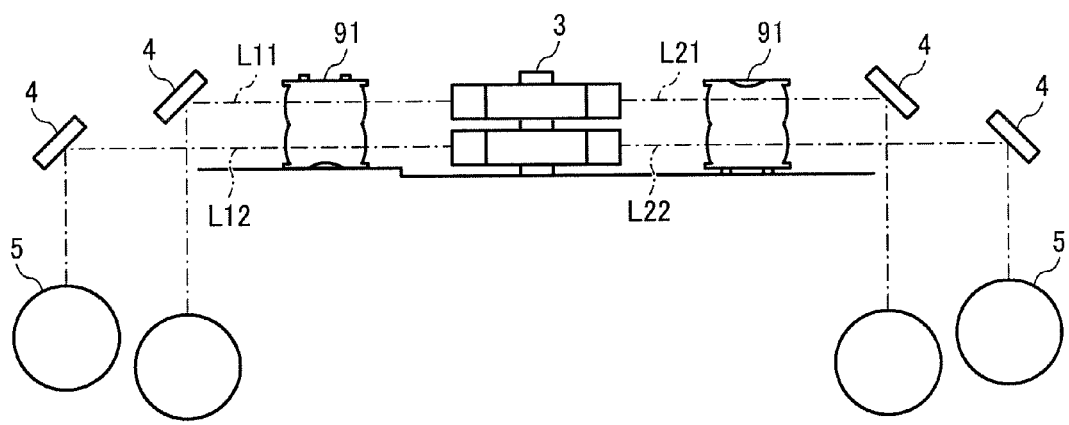
FIG. 3 is a schematic diagram illustrating a related-art optical scanner employing the plastic optical element of FIG. 1A.

In order to facilitate an understanding of the related art and of the novel features of the present invention, with reference to FIGS. 1 through 3, a description is provided of a related-art plastic optical element.

FIG. 1A is a schematic cross-sectional view of a related-art plastic optical element along a direction of lamination of the plastic optical element. FIG. 1B is a graph showing optical characteristics of the plastic optical element of FIG. 1A. FIG. 2 is a graph showing results of an optical characteristic measurement of the related-art plastic optical element. FIG. 3 is a schematic diagram illustrating a related-art optical scanner using the plastic optical element of FIG. 1A.

It is to be noted that the direction of lamination in FIG. 1B corresponds to a cross section of a plastic optical element 91.

The plastic optical element 91 is an integral double-layer plastic lens. More specifically, the plastic optical element 91 is an fθ lens having an uneven thickness. The plastic optical element 91 is made through molding and includes a first lens 91a through which at least a light beam L1 passes and a second lens 91b through which at least a light beam L2 passes. The first lens 91a is disposed on top of the second lens 91b. In FIG. 1A, a hollow arrow indicates the light beam, and a dashed-dotted line indicates an optical axis.

The first lens 91a includes an incident surface 91a1, a projection surface 91a2, and a non-optical surface 91a3. The light beam L1 strikes the incident surface 91a1 and is projected from the projection surface 91a2. Both the incident surface 91a1 and the projection surface 91a2 have a predetermined curvature. The non-optical surface 91a3 is a surface through which the light beam L1 does not pass.

The second lens 91b includes an incident surface 91b1, a light projection surface 91b2, and a non-optical surface 91b3. The light beam L2 strikes the incident surface 91b1 and is projected from the light projection surface 91b2. Both the incident surface 91b1 and the light projection surface 91b2 have a predetermined curvature. The non-optical surface 91b3 is a surface through which the light beam L2 does not pass.

The incident surfaces 91a1 and 91b1, and the projection surfaces 91a2 and 91b2, are produced by transferring mirror surfaces of a mold onto resin in a molding process. The incident surfaces 91a1 and 91b1, and the projection surfaces 91a2 and 91b2, are also referred to as transfer surfaces. The curvature changes significantly at the boundary between the incident surface 91a1 and the incident surface 91b1, and at the boundary between the light projection surface 91a2 and the light projection surface 91b2.

The non-optical surface 91a3 is disposed opposite the non-optical surface 91b3. The non-optical surface 91a3 includes a non-transfer portion 2a in which no mold pattern is transferred from the mold.

In this configuration, the cross-sectional shape of the first lens 91a and the second lens 91b in the direction of lamination, which corresponds to a sub-scanning direction in a later-described optical scanner, is not symmetrical about a boundary S between the first lens 91a and the second lens 91b.

That is, as shown in FIG. 1B, the birefringence of the first lens 91a and the second lens 91b of the plastic optical element 91 in the direction of lamination is relatively small towards the non-transfer portion 2a. However, the birefringence increases gradually towards the side opposite the non-transfer portion 2a.

In the first lens 91a, a ratio of change in the birefringence is relatively small and a gradient of the curvature is moderate. By contrast, in the second lens 91b, the ratio of change in the birefringence is significant and a gradient of the curvature is steep.

The present inventors measured optical characteristics of a plurality of the plastic optical elements 91. As shown in FIG. 2, the optical characteristics of the plurality of the plastic optical elements 91 were similar. The birefringence (a phase difference) was relatively small in the light transmission area of the first lens 91a through which the light beam L1 passes. By contrast, the birefringence of the light transmission area of the second lens 91b through which the light beam L2 passes was greater than the birefringence of the first lens 91a.

When employing such a plastic optical element 91 in the optical scanner as illustrated in FIG. 3, the wavefront of the light beam transmitted through the lens disposed substantially far from the non-transfer portion 2a fluctuated significantly, causing degradation of the beam waist diameter of the light beams L11 and L22 on a scanned surface of a photoconductive drum 5 of an image forming apparatus, resulting in degradation of imaging quality in the image forming apparatus.

In view of the above, according to the illustrative embodiment, the plastic optical element includes a first lens and a second lens, each of which transmits at least one laser beam. The first lens and the second lens are integrally formed through a molding process. Further, a non-optical surface of the first lens is disposed opposite the non-optical surface of the second lens, and the non-optical surfaces of both the first lens and the second lens include a non-transfer portion on which the surface of the mold is not transferred.

According to the illustrative embodiment, amorphous resin, of which a softening temperature is a glass transition temperature, is used to mold a transparent optical element. The amorphous resin includes, but is not limited to, poly meta-acrylic resin, polycarbonate resin, alicyclic acrylic resin, and cyclic olefin copolymer (i.e., ZEONEX (registered trademark) manufactured by ZEON Corporation).

Figure 4:
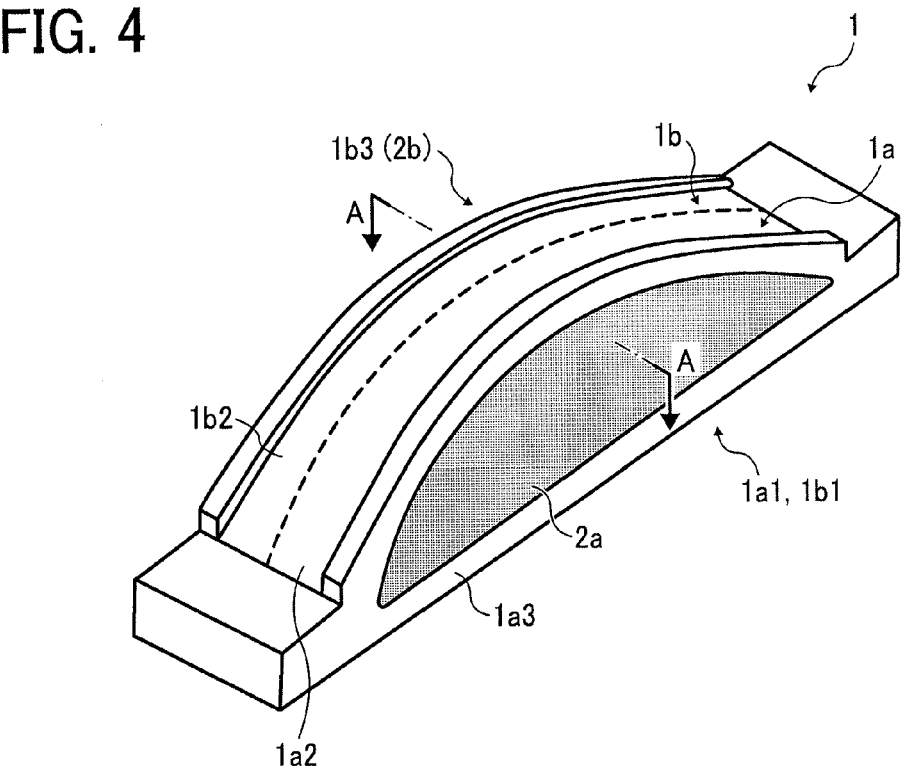
FIG. 4 is a schematic perspective view of a plastic optical element according to an illustrative embodiment of the present invention.

With reference to FIG. 4, a description is provided of a basic structure of the plastic optical element according to the illustrative embodiment of the present invention. FIG. 4 is a schematic perspective view of a plastic optical element 1, according to the illustrative embodiment of the present invention.

As illustrated in FIG. 4, the plastic optical element 1 is an fθ lens having different thicknesses in a longitudinal direction thereof. The plastic optical element 1 is curved in the longitudinal direction, and the center of the plastic optical element 1 is the thickest. The surface, which is a surface at the bottom opposite the curved surface in FIG. 4, is an optical surface consisting of incident surfaces 1a1 and 1b1. The upper surface of the plastic optical element 1 is also an optical surface consisting of projection surfaces 1a2 and 1b2. The plastic optical element 1 includes non-optical surfaces 1a3 and 1b3 serving as side surfaces adjacent to the incident surfaces 1a1 and 1b1, as well as the projection surfaces lag and 1b2. The non-optical surface 1a3 is disposed opposite the non-optical surface 1b3. The non-optical surfaces 1a3 and 1b3 are substantially flat.

When the plastic optical element 1 is employed in an optical scanner of an image forming apparatus such as a laser printer, a light beam strikes the incident surfaces 1a1 and 1b1 and is projected from the projection surfaces 1a2 and 1b2. The incident surfaces 1a1 and 1b1, and the projection surfaces 1a2 and 1b2, are optical mirror surfaces formed by transferring mirror surfaces of a mold to the resin in the molding process. The non-optical surfaces 1a3 and 1b3 include non-transfer portions (sinks) 2a and 2b where the surface of the mold is not transferred. In other words, the non-transfer portions 2a and 2b are inward deformations of the non-optical surfaces 1a3 and 1b3.

Figure 5:
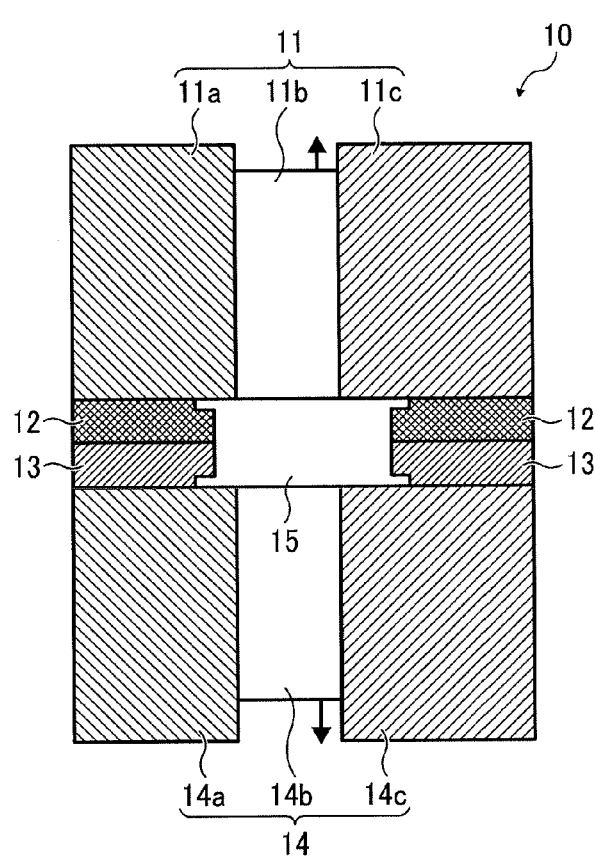
FIG. 5 is a schematic cross-sectional view of a mold assembly according to an illustrative embodiment of the present invention.

Referring now to FIG. 5, a description is provided of a mold assembly 10 for fabrication of the plastic optical element 1 according to the illustrative embodiment of the present invention. FIG. 5 is a schematic cross-sectional view of the mold assembly 10 along a line A-A in FIG. 4.

As illustrated in FIG. 5, the mold assembly 10 for an injection molding process includes a first mold pair 12, a second mold pair 13, a first side mold assembly 11, and a second side mold assembly 14. The first mold pair 12 includes transfer surfaces to be transferred to the molten resin to form the incident surface 1a1 and the projection surface 1a2. The second mold pair 13 includes transfer surfaces to be transferred to the molten resin to form the incident surface 1b1 and the projection surface 1b2. The first side mold assembly 11 is disposed at the side of the first mold pair 12 and includes a transfer surface to be transferred to the molten resin to form the non-optical surface 1a3. The second side mold assembly 14 is disposed at the side surface of the second mold pair 13 and includes a transfer surface to be transferred to the molten resin to form the non-optical surface 1b3. A cavity 15 is a space formed by the transfer surfaces of the first mold pair 12, the second mold pair 13, the first side mold assembly 11, and the second side mold assembly 14.

The first side mold assembly 11 consists of stationary members 11a and 11c to be fixed, and a movable insert 11b. The movable insert 11b is slidably disposed between the stationary members 11a and 11c such that the movable insert 11b serves as a portion of the wall of the first side mold assembly 11 forming the cavity 15. Similarly, the second side mold assembly 14 consists of stationary members 14a and 14c to be fixed, and a movable insert 14b. The movable insert 14b is slidably disposed between the stationary members 14a and 14c such that the movable insert 14b serves as a portion of the wall of the second side mold assembly 14 forming the cavity 15.

With reference to FIG. 5, a description is provided of a method of fabrication of the plastic optical element 1.

First, the mold assembly 10 is held in an injection molding machine in which the mold assembly 10 is heated to a temperature no higher than a melting point of the resin. Subsequently, the molten resin, which has been heated to a temperature higher than the softening point, is injected into the cavity 15, under an injection pressure such that the molten resin in the cavity 15 is brought into tight contact with the transfer surfaces of the first mold pair 12, the second mold pair 13, the first side mold assembly 11, and the second side mold assembly 14.

Subsequently, the molten resin in the cavity 15 is cooled to a temperature lower than the softening point so that the molten resin is solidified. After a prescribed time at which the resin pressure reaches a predetermined pressure, the movable inserts 11b and 14b are moved (retracted) in a direction away from the resin, thereby forming a void between the resin, and the movable inserts 11b and 14b.

When an internal resin pressure is equal to or less than atmospheric pressure, the void permits the free surface (the separated portion) of the resin to move or deform freely. Furthermore, heat is captured and retained so that the temperature of the free surface of the resin becomes hotter than the temperature of other portions contacting the cavity 15, causing the free surface to shrink. As a result, a recessed portion, that is, a sink, is intentionally formed, forming the non-transfer portions 2a and 2b. The non-transfer portions 2a and 2b or the sink have a shape similar to, if not identical as, the cross-sectional shape of the movable inserts 11b and 14b.

Subsequently, the solidified plastic optical element 1 is taken out of the injection molding machine and cooled in the room temperature.

With this configuration, low-pressure injection molding is made possible, and hence residual stress in the molded member is decreased. Accordingly, deformation of the plastic optical element 1 is prevented even after being removed from the injection molding machine. With this configuration, the incident surfaces 1a1 and 1b1, and the projection surfaces 1a2 and 1b2 can be shaped with a high degree of accuracy. Reducing the internal stress can produce a molded product that reduces, if not prevents entirely, birefringence.

According to the above-described illustrative embodiment, the non-transfer portions (the sink) 2a and 2b are formed in the non-optical portions 1a3 and 1b3. However, the method of producing the non-transfer portions (the sink) 2a and 2b is not limited to the method described above.

Figure 6A:
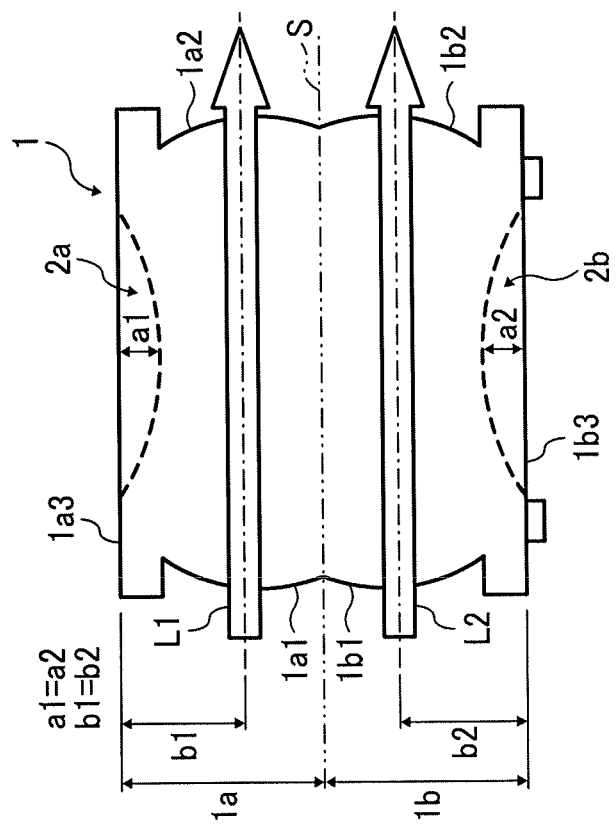
FIG. 6A is a schematic cross-sectional view of the plastic optical element along a line A-A in FIG. 4.
Figure 6B:
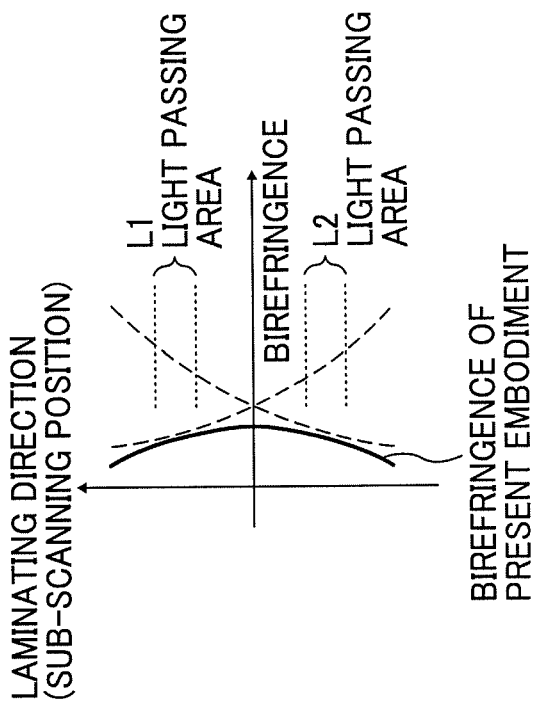
FIG. 6B is a graph showing the optical characteristics of the plastic optical element of FIG. 6A.

With reference to FIGS. 6A and 6B, a description is provided of the plastic optical element 1 according to the illustrative embodiment of the present invention. FIG. 6A is a schematic cross-sectional view of the plastic optical element 1 along the direction of lamination thereof. FIG. 6B is a graph showing the optical characteristics of the plastic optical element of FIG. 6A. In FIG. 6A, the dashed dotted line indicates an optical axis. The hollow arrow indicates the light beam.

As illustrated in FIG. 6A, the plastic optical element 1 is made by the molding method described above, and includes a first lens 1a as a top layer and a second lens 1b as a bottom layer laminated one atop the other, thereby constituting a single integrated optical element. Each of the first lens 1a and the second lens 1b passes one light beam. The thickness of the first lens 1a and the thickness of the second lens 1b are similar.

The first lens 1a includes the incident surface 1a1, the projection surface 1a2, and the non-optical surface 1a3. The light beam L1 strikes the incident surface 1a1 and is projected from the projection surface 1a2. Both the incident surface 1a1 and the projection surface 1a2 are curved with a predetermined curvature. The non-optical surface 1a3 does not pass the light beam L1.

The second lens 1b includes the incident surface 1b1, the light projection surface 1b2, and the non-optical surface 1b3. The light beam L2 strikes the incident surface 1b1 and is projected from the light projection surface 1b2. Both the incident surface 1b1 and the light projection surface 1b2 have a predetermined curvature. The non-optical surface 1b3 does not pass the light beam L2.

As described above, the incident surfaces 1a1 and 1b1, and the light projection surfaces 1a2 and 1b2 are formed by transferring the transfer surfaces (mirror surfaces) of the first mold member 12 and the second mold member 13 of the mold assembly 10 to the resin in the molding process. The curvature changes significantly at the boundary between the incident surface 1a1 and the incident surface 1b1, and at the boundary between the light projection surface 1a2 and the light projection surface 1b2.

The non-optical surface 1a3 is disposed opposite the non-optical surface 1b3. The non-optical surface 1a3 includes the non-transfer portion 2a, and the non-optical surface 1b3 includes the non-transfer portion 2b. The non-transfer portions 2a and 2b are formed as described above.

The non-transfer portions 2a and 2b are sinks having substantially the same shape. For example, in FIG. 6A, the depth a1, which is the maximum depth from the non-optical surface 1a3 of the non-transfer portion 2a is substantially equal to a depth a2, which is the maximum depth from the non optical surface 1b3 of the non-transfer portion 2b. The depth of the non-transfer portion 2a decreases gradually both toward the incident surface 1a1 and the projection surface 1a2 from the maximum depth a1 of the sink. The depth of the non-transfer portion 2b decreases gradually both toward the incident surface 1b1 and the projection surface 1b2 from the maximum depth a2.

As illustrated in FIG. 6A, the light beams L1 and L2 are parallel to each other, and travel perpendicular to the direction of lamination of the first lens 1a and the second lens 2b. A distance b1 between the non-optical surface 1a3 of the first lens 1a and a light passing area of the first lens 1a through which the light beam L1 passes is substantially the same as a distance b2 between the non-optical surface 1b3 of the second lens 1b and a light passing area through which the light beam L2 passes. The light passing area is an area of the lens through which light beams passes.

With this configuration, the cross-sectional shape of the plastic optical element 1 in the direction of lamination of the first lens 1a and the second lens 1b is symmetrical about the boundary S between the first lens 1a and the second lens 1b. It is to be noted that the boundary S is a joint portion at which the first lens 1a and the second lens 1b are connected. In FIG. 6A, the boundary S is indicated by a dashed double-dotted line extending in the direction of the optical axis.

Providing the non-transfer portions 2a and 2b at both ends of the plastic optical element 1 in the direction of lamination of the first lens 1a and the second lens 1b can make the absolute value and the gradient of the curve of the birefringence in the direction of lamination relatively small. More specifically, when compared with the optical characteristics of the related-art optical element shown in FIG. 1B, the birefringence of the second lens 1b is small. The birefringence distribution of the plastic optical element 1 is symmetrical about the boundary S between the first lens 1a and the second lens 1b. The similar birefringence is obtained for the light beam L1 and the light beam L2 when the light beams L1 and L2 pass through the plastic optical element 1 provided that the distance b1 equals the distance b2.

Using the plastic optical element 1 having such optical characteristics in the imaging optical system in an optical scanner described later can reduce fluctuation of the wavefront of the transmitted light, thereby preventing degradation of the beam waist diameter on the scanned surface.

Figure 7A:
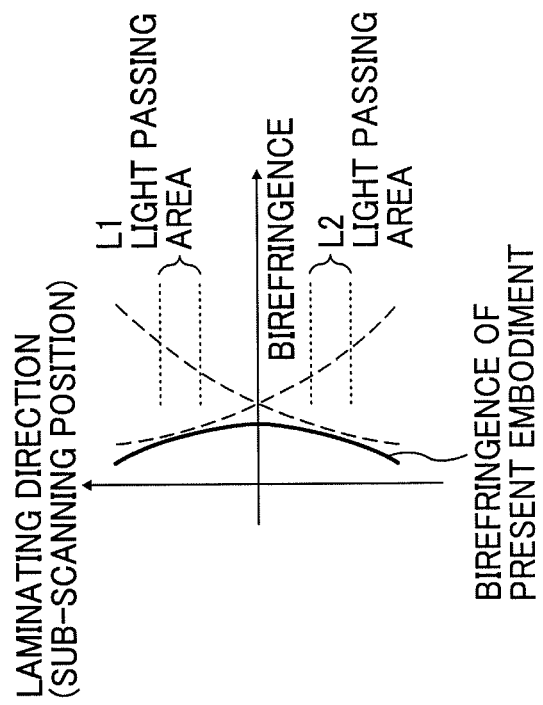
FIG. 7A is a schematic cross-sectional view of a plastic optical element along a direction of lamination thereof according to another illustrative embodiment of the present invention.
Figure 7B:
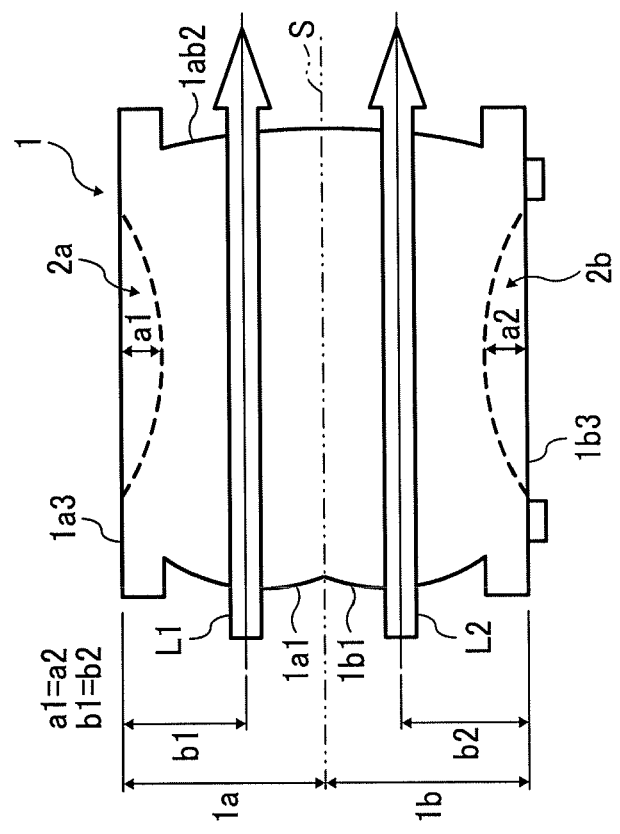
FIG. 7B is a graph showing the optical characteristics of the plastic optical element of FIG. 7A.

With reference to FIGS. 7A and 7B, a description is provided of a plastic optical element according to another illustrative embodiment of the present invention. FIG. 7A is a schematic cross-sectional view of the plastic optical element along the direction of lamination thereof according to another illustrative embodiment of the present invention. FIG. 7B is a graph showing optical characteristics of the plastic optical element of FIG. 7A.

The plastic optical element 1 shown in FIG. 7A includes a light projection surface 1ab2 serving as a common light projection surface of the first lens 1a and the second lens 1b at the light projection side for the light beams L1 and L2. In FIG. 7A, a solid line indicates the center of the light beam. Except the light projection surface 1ab2, the plastic optical element 1 shown in FIG. 7A has the same configuration as that of shown in FIG. 6A.

The light projection surface 1ab2 is formed such that one of the first mold pair 12 and one of the second mold pair 13 at one side, that is, the light projection side in this example, constitute a single mold, and its surface (mirror surface) is transferred to the resin.

As described above, the cross-sectional shape of the first lens 1a and the second lens 1b in the direction of lamination which corresponds to the sub-scanning direction of the optical scanner (described later) is symmetrical about the boundary S between the first lens 1a and the second lens 1b (FIG. 7A).

Similar to the optical characteristics shown in FIG. 6B, with this configuration, the absolute value and the gradient of the curve of the birefringence in the direction of lamination are relatively small as illustrated in FIG. 7B. Using the plastic optical element 1 in the imaging optical system in the optical scanner can reduce fluctuation of the wavefront of the transmitted light, hence preventing degradation of the beam waist diameter on the scanned surface.

Figure 8A:
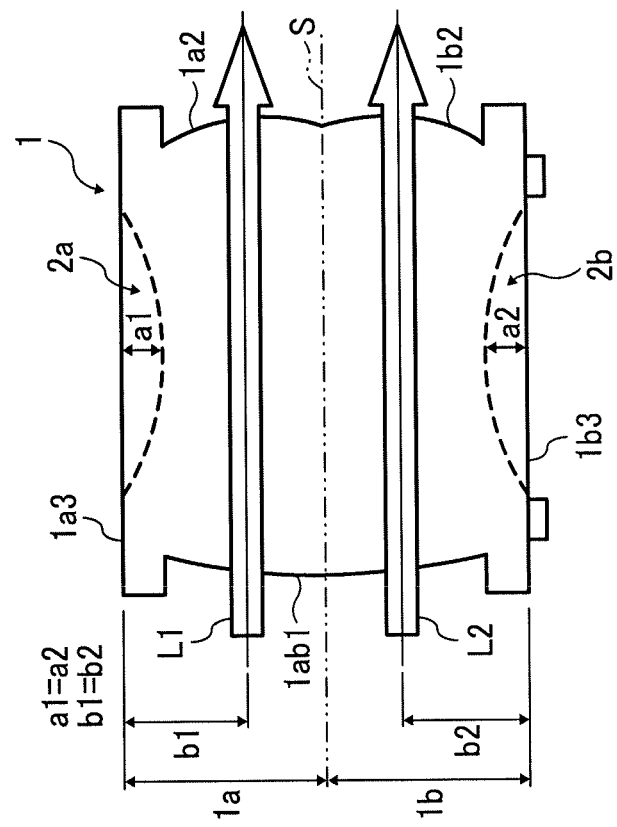
FIG. 8A is a schematic cross-sectional view of a plastic optical element along a direction of lamination thereof according to yet another illustrative embodiment of the present invention.
Figure 8B:
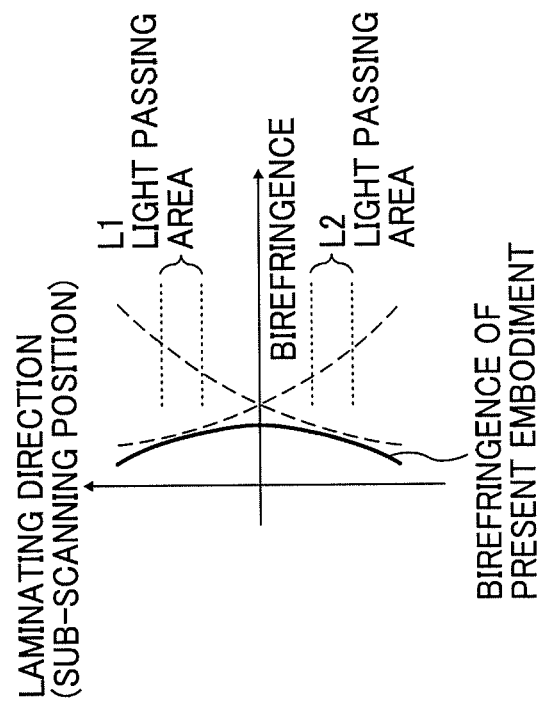
FIG. 8B is a graph showing the optical characteristics of the plastic optical element of FIG. 8A.

With reference to FIGS. 8A and 8B, a description is provided of yet another illustrative embodiment of the present invention. FIG. 8A is a schematic cross-sectional view of the plastic optical element 1 along the direction of lamination thereof according to yet another illustrative embodiment of the present invention. FIG. 8B is a graph showing optical characteristics of the plastic optical element of FIG. 8A.

The plastic optical element 1 shown in FIG. 8A includes a light incident surface 1ab1 which is a common light incident surface of the first lens 1a and the second lens 1b at the light incident side for the light beams L1 and L2. Except the light incident surface 1ab1, the plastic optical element 1 shown in FIG. 8A has the same configuration as that of shown in FIG. 6A. The light incident surface 1ab1 is formed such that one of the first mold pair 12 and one of the second mold pair 13 at one side, that is, the light incident side in this example, constitute a single mold, and its surface (mirror surface) is transferred to the resin.

As described above, the cross-sectional shape of the first lens 1a and the second lens 1b in the direction of lamination which corresponds to the sub-scanning direction of the optical scanner (described later) is symmetrical about the boundary S between the first lens 1a and the second lens 1b (FIG. 8A).

Similar to the optical characteristics shown in FIG. 6B, with this configuration, the absolute value and the gradient of the curve of the birefringence in the direction of lamination are relatively small as illustrated in FIG. 8B. Using the plastic optical element 1 as the imaging optical system in the optical scanner can reduce fluctuation of the wavefront of the transmitted light, hence preventing degradation of the beam waist diameter on the scanned surface.

Figure 9B:
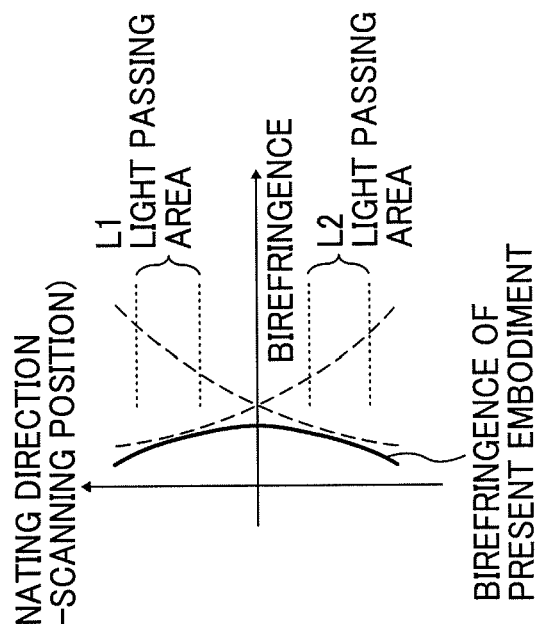
FIG. 9B is a graph showing the optical characteristics of the plastic optical element of FIG. 9A.
Figure 9A:
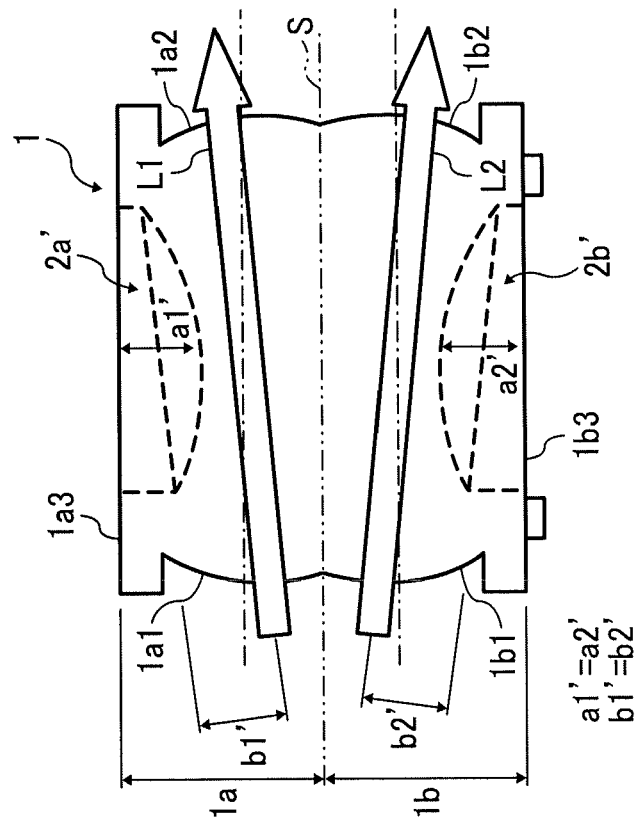
FIG. 9A is a schematic cross-sectional view of a plastic optical element along a direction of lamination thereof according to yet still another illustrative embodiment of the present invention.

With reference to FIGS. 9A and 9B, a description is provided of a plastic optical element according to still yet another illustrative embodiment of the present invention. FIG. 9A is a schematic cross-sectional view of a plastic optical element along the direction of lamination thereof according to still yet another illustrative embodiment of the present invention. FIG. 9B is a graph showing optical characteristics of the plastic optical element of FIG. 9A.

The plastic optical element 1 shown in FIG. 9A includes non-transfer portions 2a' and 2b'. The shape of the non-transfer portions 2a' and 2b' changes in the light transmission direction to accommodate the light beams L1 and L2 passing through the first lens 1a and the second lens 1b in a non-parallel manner in which the distance between the light beam L1 and the light beam L2 is narrower at the incident side than at the projection side. Except the shape of the non-transfer portions 2a' and 2b', the plastic optical element 1 shown in FIG. 9A has the same configuration as that of shown in FIG. 6A. According to the present embodiment, the light beams L1 and L2 pass through the areas which are symmetrical about the boundary S between the first lens 1a and the second lens 1b.

The non-transfer portions 2a' and 2b' are formed to have the sink (recessed shape) so as to correspond to the angle of light beams L1 and L2 relative to the boundary S. More specifically, in FIG. 9A, a maximum depth a1' of the non-transfer portion 2a' from the non-optical surface 1a3 is the same as a maximum depth a2' of the non-transfer portion 2b' from the non-optical surface 1b3. However, a rate of decrease in the depth of the non-transfer portion 2a' from the portion having the maximum width a1' towards the incident surface 1a1 is less than a rate of decrease in the depth of the non-transfer portion 2a' towards the light projection surface 1a2. A rate of decrease in the depth of the non-transfer portion 2b' from the portion having the maximum width a2' towards the light incident surface 1b1 is less than a rate of decrease in the depth of the non-transfer portion 2b' towards the light projection surface 1b2.

In other words, the shape of the sink of the non-transfer portion 2a' is substantially the same as that of the non-transfer portion 2b', and the inclination of the sinks in the optical axis direction is parallel to the corresponding light beams L1 and L2. (For example, in FIG. 9A, a distance b1' equals a distance b2'.) The distance between the bottom surface of the non-transfer portion 2a' and the light beam L1 is the same as the distance between the bottom surface of the non-transfer portion 2b' and the light beam L2 at an arbitrary position.

Figure 10:
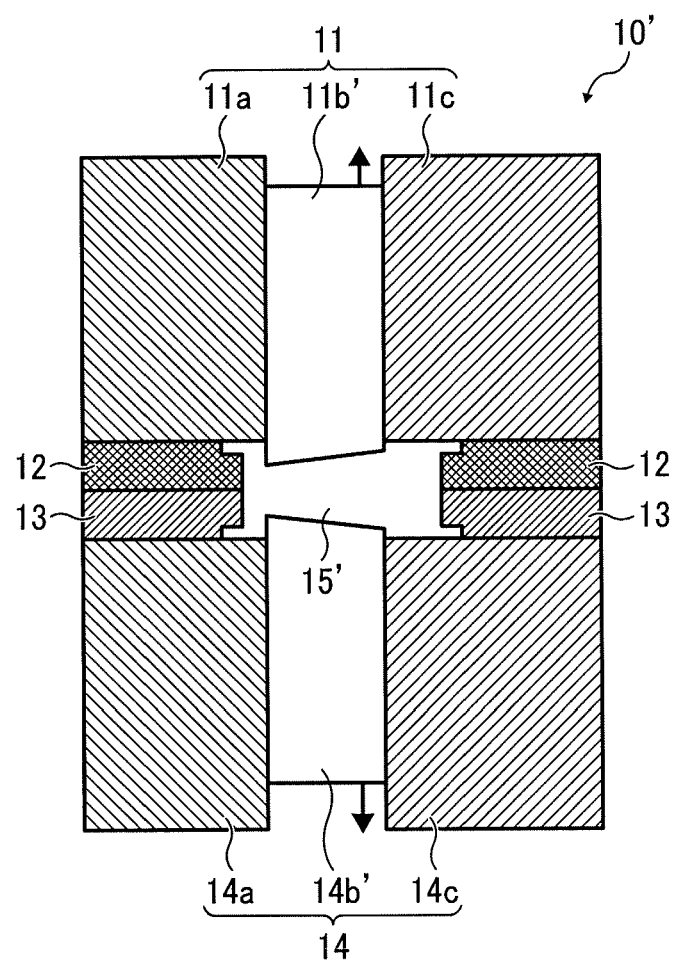
FIG. 10 is a schematic cross-sectional view of a mold assembly for fabrication of the plastic optical element of FIG. 9A.

With reference to FIG. 10, a description is provided of fabrication of the non-transfer portions 2a' and 2b'. FIG. 10 is a schematic cross-sectional view of a mold assembly 10'. As illustrated in FIG. 10, the walls of movable inserts 11b' and 14b' project inside a cavity 15'. The walls of the movable inserts 11b' and 14b' projecting inside the cavity 15' are angled. In this state, the molten resin is injected into the cavity 15'. After a prescribed time at which the resin pressure reaches a predetermined pressure, the movable inserts 11b' and 14b' are moved (retracted) in a direction away from the resin, thereby forming the non-transfer portions (the sinks) 2a' and 2b'.

The wall of the movable insert 11b' is angled such that the wall is parallel to the light beam L1 passing through the plastic optical element 1 with the distance b1' therebetween. The wall of the movable insert 14b' is angled such that the wall is parallel to the light beam L2 passing through the plastic optical element 1 with the distance b2' therebetween (FIG. 9A).

As described above, the cross-sectional shape of the first lens 1a and the second lens 1b in the direction of lamination which corresponds to the sub-scanning direction of the optical scanner is symmetrical about the boundary S (FIG. 9A). Similar to the optical characteristics shown in FIG. 6B, with this configuration, the absolute value and the gradient of the curve of the birefringence in the direction of lamination are relatively small as illustrated in FIG. 9B. Using the plastic optical element 1 as the imaging optical system in the optical scanner can reduce fluctuation of the wavefront of the transmitted light, hence preventing degradation of the beam waist diameter on the scanned surface.

With reference to FIGS. 11A and 11B, a description is provided of the plastic optical element according to still yet another illustrative embodiment of the present invention. FIG. 11A is a schematic cross-sectional view of the plastic optical element 1 along the direction of lamination thereof. FIG. 11B is a graph showing the optical characteristics of the plastic optical element of FIG. 11A.

The plastic optical element 1 shown in FIG. 11A includes non-transfer portions 2a" and 2b". In the present embodiment, the depth of the non-transfer portion 2a" differs from the depth of the non-transfer portion 2b". Except the depth of the non-transfer portions 2a" and 2b", the plastic optical element 1 shown in FIG. 11A has the same configuration as that of shown in FIG. 6A.

The non-transfer portions 2a" and 2b" are the sinks (recessed portions) having a different shape. For example, in FIG. 11A, a depth a1", which is the maximum depth from the non-optical surface 1a3 of the non-transfer portion 2a", is different from a depth a2" which is the maximum depth from the non-optical surface 1b3 of the non-transfer portion 2b". According to the present embodiment, the depth a1" is less than the depth a2" (a1"<a2").

The depth of the non-transfer portion 2a" decreases gradually both toward the incident surface 1a1 and the light projection surface 1a2 from the maximum depth a1". The depth of the non-transfer portion 2b" decreases gradually toward the incident surface 1b1 and the light projection surface 1b2 from the maximum depth a2".

The difference in the shape of the non-transfer portions 2a" and 2b" is formed by changing the timing at which the movable inserts 11b and 14b are separated from the resin after the mold resin is injected in the cavity 15 or by changing the size of voids between the movable insert 11b and the resin, and between the movable insert 14b and the resin.

Providing the non-transfer portions 2a" and 2b" at both ends of the plastic optical element 1 in the direction of lamination of the first lens 1a and the second lens 1b makes the absolute value and the gradient of the curve of the birefringence in the direction of lamination relatively small as illustrated in FIG. 11B. More specifically, when compared with the optical characteristics of the related-art optical element in FIG. 1B, the birefringence of the second lens 1b is small.

As described above, the cross-sectional shape of the first lens 1a and the second lens 1b in the direction of lamination which corresponds to the sub-scanning direction of the optical scanner is not symmetrical about the boundary S between the first lens 1a and the second lens 1b. Therefore, the distribution of the birefringence of the first lens 1a differs slightly from that of the second lens 1b with respect to the borderline S. However, it does not adversely affect the imaging optical system.

Using the plastic optical element 1 having such optical characteristics as the imaging optical system in the optical scanner can reduce fluctuation of the wavefront of the transmitted light, thereby preventing degradation of the beam waist diameter on the scanned surface.

Figure 12A:
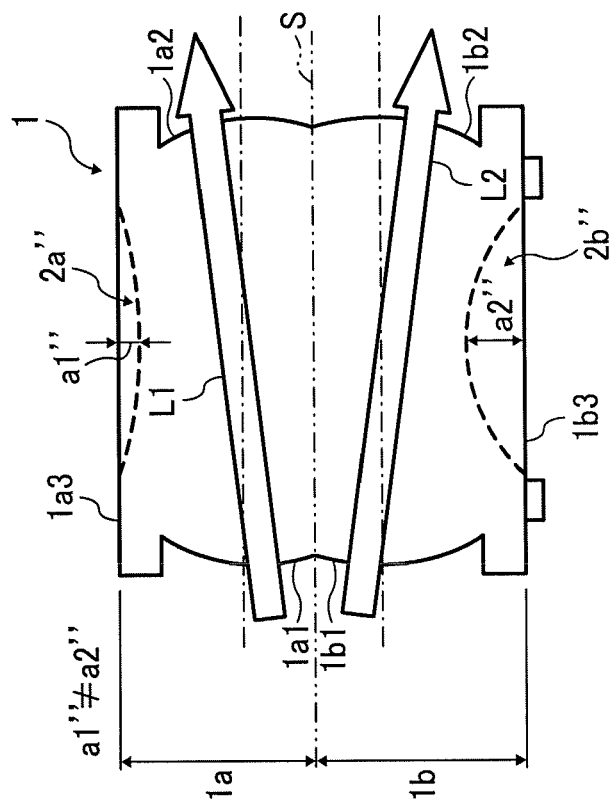
FIG. 12A is a schematic cross-sectional view of a plastic optical element along a direction of lamination thereof according to yet still another illustrative embodiment of the present invention.
Figure 12B:
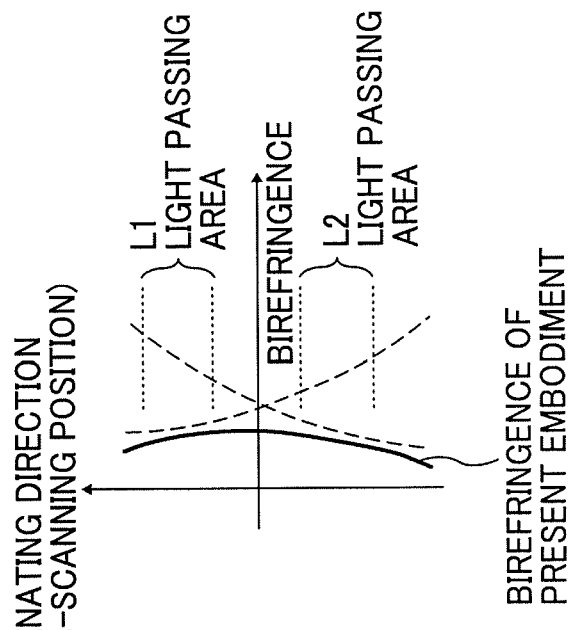
FIG. 12B is a graph showing the optical characteristics of the plastic optical element of FIG. 12A.

With reference to FIGS. 12A and 12B, a description is provided of a plastic optical element according to still yet another illustrative embodiment of the present invention. FIG. 12A is a schematic cross-sectional view of a plastic optical element along the direction of lamination thereof. FIG. 12B is a graph showing optical characteristics of the plastic optical element of FIG. 12A.

The plastic optical element 1 shown in FIG. 12A transmits the light beams L1 and L2 in the non-parallel manner in which the distance between the light beam L1 and the light beam L2 is narrower at the incident side than at the projection side. Other than that, the plastic optical element 1 shown in FIG. 12A has the same configuration as that of shown in FIG. 11A.

Similar to the optical characteristics shown in FIG. 11B, with this configuration, the absolute value and the gradient of the curve of the birefringence of the first lens 1a and the second lens 1b in the direction of lamination are relatively small as illustrated in FIG. 12B. Using the plastic optical element 1 as the imaging optical system in the optical scanner can reduce fluctuation of the wavefront of the transmitted light, hence preventing degradation of the beam waist diameter on the scanned surface.

Figure 13:
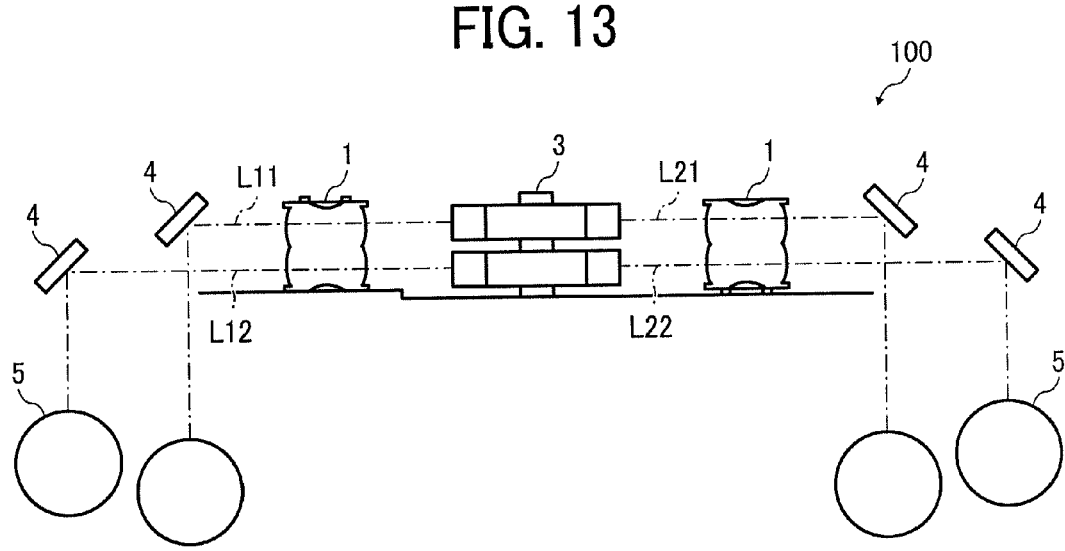
FIG. 13 is a schematic cross-sectional diagram illustrating an optical scanner employing the plastic optical element of the present invention.
Figure 14:
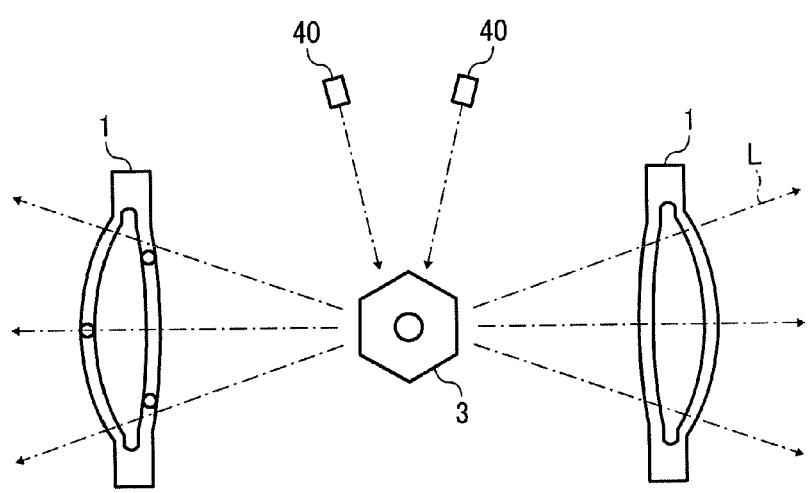
FIG. 14 is a plan view of the optical scanner of FIG. 13.

With reference to FIGS. 13 and 14, a description is provided of the optical scanner according to the illustrative embodiment of the present invention. FIG. 13 is a schematic cross-sectional view of an optical scanner 100 employed in image forming apparatuses such as a laser printer and a digital copier. FIG. 14 is a plan view of the optical scanner 100.

The optical scanner 100 includes light sources 40 (shown in FIG. 14), two polygon mirrors 3 disposed one atop the other, two plastic optical elements 1, four folding mirrors 4, and so forth. The light sources 40 include laser diodes to project a plurality of light beams, for example, light beams L11, L12, L21, and L22. The polygon mirrors 3 include deflection surfaces that deflect the light beams from the light sources at a predetermined angle at a constant angular speed. The plastic optical elements 1 serve as imaging optical systems that convert the light beams L11, L12, L21, and L22 deflected by the polygon mirrors 3 into light beams at a constant speed and focus the light beams onto surfaces of photoconductive drums 5. The four folding mirrors 4 direct the light beams L11, L12, L21, and L22 from the plastic optical elements 1 to the respective photoconductive drums 5.

The optical scanner 100 may employ the plastic optical element 1 illustrated in FIGS. 6 through 9 or FIGS. 11 and 12 as the imaging optical system.

Next, a description is provided of the operation of the optical scanner 100. The plurality of light beams (here, four light beams L11, L12, L21, and L22) projected from the light source is focused temporarily near the deflection surfaces of the polygon mirrors 3. The polygon mirrors 3 rotate at a certain angular speed in a direction that corresponds to a scan direction. The light beams focused near the deflection surfaces of the polygon mirrors 3 are deflected at the constant angular speed while the polygon mirrors 3 rotate.

The deflected light beams L11, L12, L21, and L22 pass through the plastic optical elements 1, thereby being converted to the light beams at the constant speed. Then, the light beams are reflected by the folding mirrors 4 to the surfaces of the photoconductive drums 5 so that the light beams scan the photoconductive drums 5.

In a case in which the optical scanner 100 is employed in a digital copier, the intensity of the light from the light source is modulated based on image information of an original image. This light is focused onto the surfaces of the photoconductive drums 5 to form electrostatic latent images of the original image on the surfaces of the photoconductive drums 5.

Using the plastic optical elements 1 in the optical scanner 100 can reduce fluctuation of the wavefront of the light beams L11, L12, L21, and L22 passed through the first lens 1a and the second lens 1b, thereby preventing degradation of the beam waist diameter on the scanned surface of the photoconductive drums 5.

Figure 15:
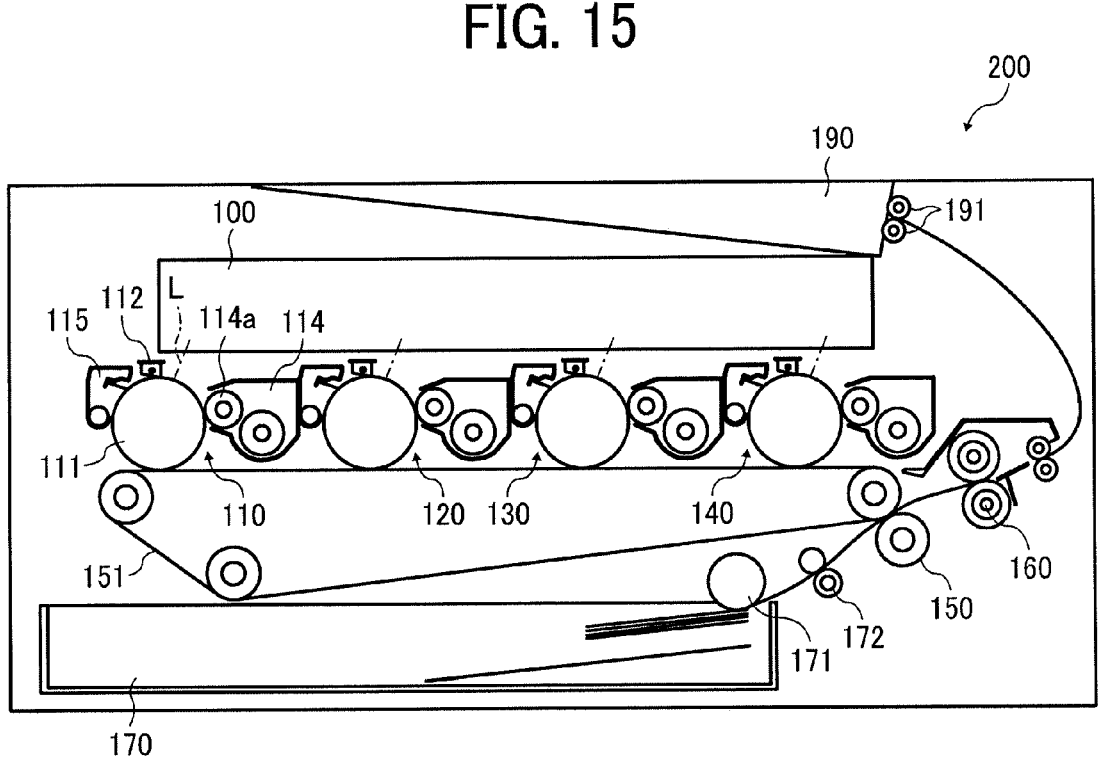
FIG. 15 is schematic cross-sectional view of an image forming apparatus according to an illustrative embodiment of the present invention.

With reference to FIG. 15, a description is provided of an image forming apparatus according to an illustrative embodiment of the present invention. FIG. 15 is a schematic side view of the image forming apparatus employing the optical scanner 100.

In FIG. 15, an image forming apparatus 200 includes an intermediate transfer belt 151, a fixing device 160, a sheet feeding unit 170, and image forming units 110, 120, 130, and 140, one for each of the colors black, cyan, magenta, and yellow. The image forming units 110, 120, 130, and 140 are disposed substantially above the intermediate transfer belt 151 and form toner images of black, cyan, magenta, and yellow. The toner images are transferred onto the intermediate transfer belt 151 so that the toner images are superimposed one atop the other, thereby forming a composite color toner image. The composite color toner image is transferred onto a recording medium conveyed from the sheet feeding unit 170 which stores multiple recording media sheets. The fixing device 160 fixes the composite toner image on the recording medium with heat and pressure, thereby forming a color image.

It is to be noted that the image forming units 110, 120, 130, and 140 all have the same configuration as all the others, differing only in the color of toner employed. Thus, a description is provided of the image forming unit 110 as an example of the image forming unit.

The image forming unit 110 includes a photoconductive drum 111 (which corresponds to the photoconductive drum 5 in FIG. 13), a charging device 112, a developing device 114, and a cleaning device 115. The charging device 112 charges the surface of the photoconductive drum 111. Based on image data, the optical scanner 100 scans the photoconductive drum 111, thereby forming an electrostatic latent image thereon. The developing device 114 develops the electrostatic latent image with toner using a developing roller 114a, thereby forming a visible image, also known as a toner image. The cleaning device 115 removes and collects residual toner remaining on the photoconductive drum 111.

The optical scanner 110 may correct a positional error of a scan line in the image forming units 110, 120, 130, and 140.

The intermediate transfer belt 151 is a belt formed into a loop and wound around a plurality of rollers, thereby being rotated. The intermediate transfer belt 151 contacts the photoconductive drums of the image forming units 110, 120, 130, and 140, and a secondary transfer roller 150. A primary transfer roller, not illustrated, is disposed inside the loop formed by the intermediate transfer belt 151, facing the photoconductive drums.

The recording medium is picked up from the sheet feeding unit 170 one sheet at a time by a pickup roller 171 and conveyed to a pair of registration rollers 172. Subsequently, the recording medium is conveyed to a secondary transfer nip between the secondary transfer roller 150 and its opposite roller where the composite toner image is transferred onto the recording medium. Then, the recording medium is conveyed to the fixing device 160 by a sheet conveyance belt.

The fixing device 160 includes a fixing member heated at a certain temperature and a pressing member disposed opposite the fixing member. The pressing member presses against the fixing member, thereby forming a fixing nip. As the recording medium passes through the fixing nip, heat and pressure are applied to the recording medium so that the composite toner image on the recording medium is fixed.

When forming an image in the image forming apparatus 200, for example, the charging device 112 charges the surface of the photoconductive drum 111. The optical scanner 100 illuminates the photoconductive drum 111 with light based on an original image, thereby reducing the electric potential of the surface of the photoconductive drum 111. As the photoconductive drum 111 rotates, a portion of the photoconductive drum 111 with reduced electric potential arrives at the developing device 114 and contacts a toner layer on the developing roller 114a. Accordingly, the charged toner sticks to the photoconductive drum 111, forming a toner image thereon.

The toner image on the photoconductive drum 111 is transferred onto the intermediate transfer belt 151 at a position at which the primary transfer roller presses the intermediate transfer belt 151 against the photoconductive drum 111.

Similar to the image forming unit 110, the toner images on the photoconductive drums of the image forming units 120, 130, and 140 are transferred onto the intermediate transfer belt 151 so that they are superimposed one atop the other, thereby forming the composite color toner image.

As the recording medium is conveyed to the secondary transfer roller 150 by the intermediate transfer belt 151, the composite color toner image is transferred onto the recording medium. Subsequently, the recording medium bearing the composite color toner image passes through the fixing device 160 so that the composite color toner image is fixed onto the recording medium by heat and pressure. Subsequently, the recording medium is discharged onto a sheet discharge tray 190 by a sheet discharge roller 191.

As described above, by employing the optical scanner 100 of the illustrative embodiments in the image forming apparatus 200, optical scanning can be performed accurately, thereby enabling high-quality imaging. More specifically, when employing the optical scanner 100 in a color laser printer and a color digital copier, a high-quality color image with less color drift can be formed.

When employing the plastic optical element of the illustrative embodiments as a scan lens, an undesirable change in a focal point is reduced, if not prevented entirely. Thus, high-quality imaging can be achieved in the image forming apparatus.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An integral plastic optical element for focusing light on a target, comprising:
   a first lens including an incident surface, a projection surface opposite the incident surface, and a first non-optical surface through which a light beam does not pass, the first non-optical surface including a non-transfer portion; and
   a second lens, integrally formed with the first lens, and including an incident surface, a projection surface opposite the incident surface, and a second non-optical surface through which a light beam does not pass, the non-optical surface including a non-transfer portion disposed opposite the non-optical surface of the first lens,
   wherein the first and second non-optical surfaces are on opposite side surfaces of the integral plastic optical element and the non-transfer portions of the first lens and the second lens are portions on which no surface is transferred from a surface of a mold used to form the integral plastic optical element, and at least one light beam passes from the incident surface to the projection surface of each of the first lens and the second lens.

2. An integral plastic optical element for focusing light to a target, comprising:
   a first lens including an incident surface, a projection surface opposite the incident surface, and a first non-optical surface through which a light beam does not pass, the first non-optical surface including a non-transfer portion; and
   a second lens including an incident surface, a projection surface opposite the incident surface, and a second non-optical surface through which a light beam does not pass, the second non-optical surface including a non-transfer portion disposed opposite the non-optical surface of the first lens,
   wherein a cross-sectional shape of the first lens and the second lens in a direction of lamination is symmetrical about a boundary of the first lens and the second lens, the first non-optical surface and second non-optical surfaces are on opposite side surfaces of the integral plastic optical element and the non-transfer portions of the first lens and the second lens are portions on which no surface is transferred from a surface of a mold used to form the plastic optical element,
   wherein at least one light beam passes from the incident surface to the projection surface of each of the first lens and the second lens.

3. The integral plastic optical element according to claim 1, wherein the non-transfer portion of the first lens and the non-transfer portion of the second lens each include a sink having substantially the same shape.

4. The integral plastic optical element according to claim 3, wherein a depth of the sink of both the first lens and the second lens decreases gradually both toward the incident surface and the projection surface from a maximum depth of the sink.

5. The integral plastic optical element according to claim 3, wherein the long axes of the sinks of the first lens and the second lens are parallel to the light beams passing through the first lens and the second lens.

6. The integral plastic optical element according to claim 1, wherein a distance between the non-optical surface of the first lens and an area of the first lens through which the light beam passes, and a distance between the non-optical surface of the second lens and an area of the second lens through which the light beam passes, are substantially the same.

7. An optical scanner comprising: a light source to project a light beam; a deflector to deflect and scan the light beam from the light source; an imaging optical system including the integral plastic optical element of claim 1, to focus the deflected light beam on a target.

8. An image forming apparatus comprising the optical scanner of claim 7.

* * * * *